C. A. XARDELL.
ELECTRIC HEATER.
APPLICATION FILED JAN. 8, 1920.
1,350,631.   Patented Aug. 24, 1920.
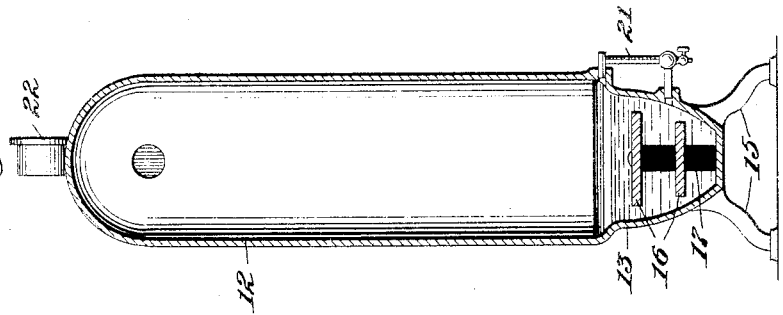
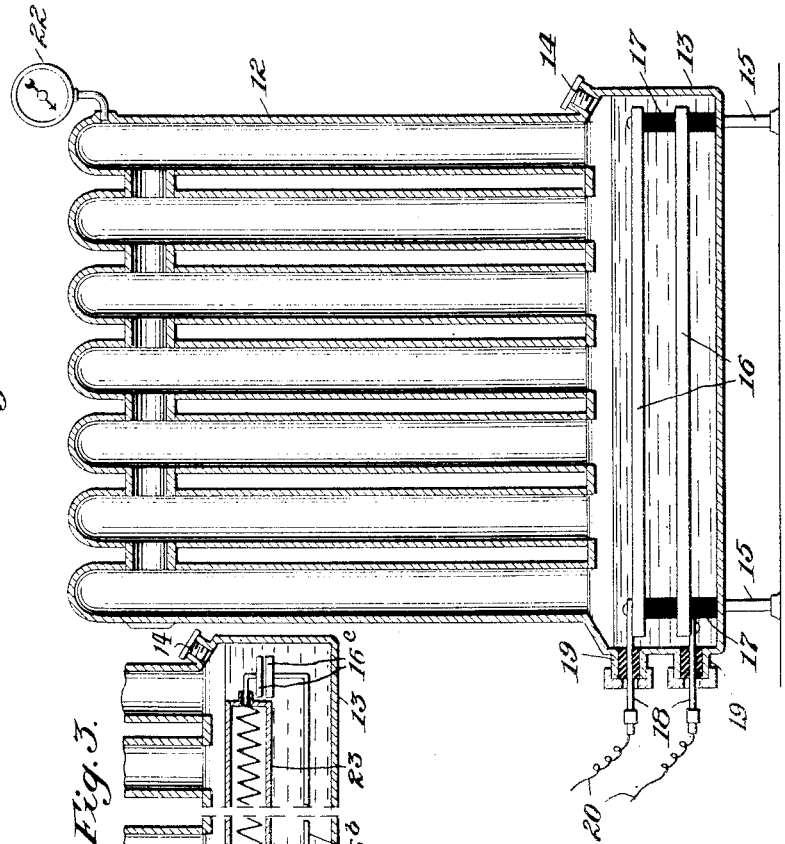
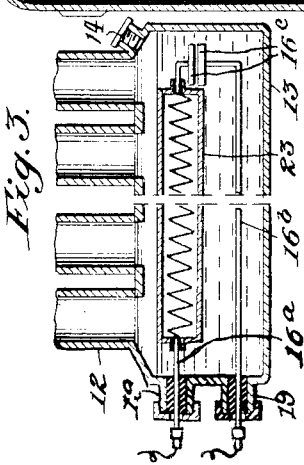

UNITED STATES PATENT OFFICE.

CHARLES A. XARDELL, OF UTICA, NEW YORK.

ELECTRIC HEATER.

1,350,631.  Specification of Letters Patent.  Patented Aug. 24, 1920.

Application filed January 8, 1920. Serial No. 350,066.

*To all whom it may concern:*

Be it known that I, CHARLES A. XARDELL, a citizen of the United States, residing at Utica, in the county of Oneida and State of New York, have invented or discovered certain new and useful Improvements in Electric Heaters, of which the following is a specification, reference being had therein to the accompanying drawings.

This invention relates to electric radiator heaters and has for its object to provide a heater of this class which is self-regulating and which will be economical in use, as will hereinafter more fully appear.

In the accompanying drawing Figure 1 is a longitudinal section of the improved heater and Fig. 2 a cross section thereof. Fig. 3 is a broken out sectional view of a modified form of the invention.

Referring to the drawing, 12 denotes a radiator body which may be of any desired size or which may consist of any desired number of sections, and at the base of said body is a liquid-tight receptacle 13 having a normally closed opening 14 through which it may be filled or emptied, the whole structure being supported by legs 15. Within the receptacle 13 are the electrodes or heating elements 16 of any suitable resistance material and shown in Fig. 1 as being in the form of plates 16 mounted on insulating supports 17. Attached to said plates 16 are conducting bars or rods 18 passing outward from said receptacle through nozzles 19 packed with insulating material through which the said bars or rods extend to the outside of the heater, the said bars or rods being connected to conductors 20 extending to any suitable source of supply for electric current. The receptacle 13 is to contain a liquid in which the heating members 15 are normally immersed, said liquid serving as a conductor between said members for the electric current. The receptacle 13 is preferably provided with a glass gage 21 communicating therewith and which affords convenient means for showing the depth of the liquid in said receptacle.

In the operation of the heater, when the current is turned on, a portion of the liquid in the receptacle 13 will be converted into steam by the heating members and by the heat generated by the passage of the electric current through the liquid which serves to some extent as a rheostat or resistance. The steam thus generated will heat the radiator, but the level of the liquid will be lowered by evaporation until it falls below the upper electrode member 16 and when this occurs the two members 16 will become electrically disconnected, causing the circuit to be broken, and the heating operation will then be suspended until the level of the liquid is raised by condensation, and when this level again rises to the upper electrode or heating member the circuit will again be closed, and the heating operation resumed. Thus when the heater is first started into operation and the room or apartment to be warmed is quite cold, condensation of the liquid in the radiator will proceed rapidly, and after the circuit has been broken by the evaporation of the liquid it will be quickly closed again and the heating operation resumed. Thus the current will be flashed on again quickly, after the circuit has been opened, when the temperature of the room or apartment to be heated is low, but as the temperature of the room or apartment rises the interruptions and resumptions of the electric current will occur less frequently and no current will be used except as may be required.

The temperature to which it may be desired to heat a room or apartment may be regulated by the depth of the liquid in the receptacle 13. For example, if the liquid is of such depth as to be say one-fourth of an inch above the upper electrode or member 16 the evaporation of the liquid until it may fall below said upper electrode or member may result in a steam pressure in the radiator of say five pounds; but if it be desired to make this steam pressure more, and the resulting temperature higher, the depth of the liquid in the receptacle 13 may be increased, resulting, of course, in an increased steam pressure and higher temperature before the upper electrode will be cut out by the evaporation of the liquid. To decrease the temperature the normal level in the receptacle will be lowered, as will be understood. The steam pressure in the radiator may, if desired, be determined by a gage 22.

In the modified form of the invention shown in Fig. 3 a resistance coil 16$^a$ is employed as the upper heating member and the electric current is conveyed thereto through a conductor 16$^b$ (which may, if desired, also be of resistance material) and through slightly separated conducting plates 16$^c$, the electric communication between which plates will be established by the liquid in the receptacle 13 when the level of the liquid is high enough for this purpose. The coil 16ª will preferably be inclosed in a casing from which said coil is insulated.

From the foregoing it will be understood that the invention provides an electric heater which will be economical in the use of the electric current, in that the current will be automatically cut off when a certain amount of evaporation of the liquid in the receptacle 13 has occurred, so that there will be no consumption of the current beyond that which may be required to develop a certain amount of heat; and it will also be evident that the developed heat will be automatically regulated and that the temperature to be arrived at may be higher or lower, as may be desired, this regulation of the temperature being effected by raising or lowering the level of the liquid in the receptacle 13, as hereinbefore stated. It will be understood of course that there will be no appreciable diminution of the quantity of the liquid in the heater, in that the receptacle will normally be tightly closed, so that no steam resulting from evaporation of liquid will escape. In starting the heater into operation, however, it may be desirable to let the cold air escape from the radiator through an escape valve or pet cock such as steam radiators are commonly equipped with.

If it be desired to lower the boiling point of the liquid in the receptacle 13 the air may be partially exhausted from the radiator to make a partial vacuum, and this may be particularly desirable when only a comparatively low degree of heat is necessary to heat a room or apartment in mild weather.

While pure water is practically a non-conductor of electricity its conductivity may be enhanced by dissolving any metallic salt therein and thus the heat generated by the passage of the electric current through the liquid in the receptacle 13 may be regulated or varied by varying the amount of such salt in the liquid.

Having thus described my invention I claim and desire to secure by Letters Patent:

1. An electric heater comprising a radiator having a longitudinally extending liquid-tight receptacle at its base and with which receptacle the chambers of the radiator sections communicate, longitudinally extending electrodes or heating members, arranged one above the other, in said receptacle and insulated from each other, and electric communication between which members may be established by liquid in said receptacle, and insulated electric connections from outside of the heater to said members; whereby, when the electric current is turned on the heating operation will proceed until the liquid in said receptacle is caused, by evaporation, to fall below the level of the upper electrode or heating member, when the circuit will be broken, but will be resumed when the liquid is caused, by condensation, to rise to said upper electrode or heating member and thus close the circuit.

2. An electric heater comprising a radiator having a longitudinally extending liquid-tight receptacle at its base and with which receptacle the chambers of the radiator sections communicate, said receptacle having a normally closed filling and emptying opening, longitudinally extending electrodes or heating members, arranged one above the other, in said receptacle and insulated from each other, and electric communication between which members may be established by liquid in said receptacle, and insulated electric connections from outside of the heater to said members; whereby, when the electric current is turned on the heating operation will proceed until the liquid in said receptacle is caused, by evaporation, to fall below the level of the upper electrode or heating member, when the circuit will be broken, but will be resumed when the liquid is caused, by condensation, to rise to said upper electrode or heating member and thus close the circuit.

3. An electric heater comprising a radiator having a longitudinally extending liquid-tight receptacle at its base and with which receptacle the chambers of the radiator sections communicate, said receptacle being provided with a liquid-level gage communicating therewith, longitudinally extending electrodes or heating members, arranged one above the other, in said receptacle and insulated from each other, and electric communication between which members may be established by liquid in said receptacle, and insulated electric connections from outside of the heater to said members; whereby, when the electric current is turned on the heating operation will proceed until the liquid in said receptacle is caused, by evaporation, to fall below the level of the upper electrode or heating member, when the circuit will be broken, but will be resumed when the liquid is caused, by condensation, to rise to said upper electrode or heating member and thus close the circuit.

4. An electric heater comprising a radiator having a longitudinally extending liquid-tight receptacle at its base and with which the sections of the radiator communicate, longitudinally extending electrodes or heating members, arranged one above the other, in said receptacle and the electric communication between which members may be established by liquid in said receptacle, the uppermost of said heating members being in the form of a resistance coil, a casing inclosing said coil, and insulated electric connections from outside of the heater to said heating members; whereby, when the electric current is turned on the heating operation will proceed until the liquid in said receptacle is caused, by evaporation, to fall below the level of the upper electrode or heating member, when the circuit will be broken, but will be resumed when the liquid is caused, by condensation, to rise to said upper electrode or heating member and thus close the circuit.

In testimony whereof I affix my signature.

CHARLES A. XARDELL.